March 5, 1957 N. E. ANDERSON 2,784,349
ELECTRIC ARC WELDING
Filed Dec. 28, 1951 2 Sheets-Sheet 1

INVENTOR
NELSON E. ANDERSON
BY
ATTORNEY

INVENTOR
NELSON E. ANDERSON
BY
ATTORNEY

United States Patent Office 2,784,349
Patented Mar. 5, 1957

2,784,349

ELECTRIC ARC WELDING

Nelson E. Anderson, Berkeley Heights, N. J., assignor to Air Reduction Company, Incorporated, New York, N. Y., a corporation of New York Application December 28, 1951, Serial No. 263,875

10 Claims. (Cl. 315—176)

This invention relates to electric arc welding. Electric arc welding with consuming metal electrodes or with so-called non-consuming electrodes of carbon or tungsten, or the like, may be performed with direct current or alternating current in air or in a gas shield. The open circuit voltages available from standard welding transformers or generators are far too low to ionize or break down the arc gap or make is conductive and establish a welding arc. This is true even when there is extremely short spacing between the electrode and the work. This may be overcome by touching the electrode to the work or by providing a conducting path of steel wool, or the like, between the electrode and the work to start the arc. These systems, while in fairly common use, are not always entirely satisfactory. In addition, when welding with alternating current and certain conditions of current and electrode and work material, the arc becomes non-conductive during the A. C. current reversals to an extent which prevents reignition of the arc on the next half cycle with the voltage available from the welding transformer. To avoid the necessity for touch starting, and to maintain the arc gap conductive during current reversals in A. C. welding, the output of a high voltage supply may be superimposed on the welding voltage. To effect the two functions described above, which will hereinafter be referred to as "starting" and "stabilizing," it is now well known that a voltage in excess of 1000 volts is generally required, but at relatively low average currents. Such high voltages can be provided with relatively small and inexpensive equipment and without hazard to the operator by employing high frequency alternating current.

The problem of superimposing the high voltage source on the low voltage welding current supply gives rise to certain limitations on the frequency of the high voltage supply. There are two accepted ways by which the high frequency source can be coupled to the welding circuit. The first of these is by capacitive coupling, in which case the high frequency generator is series connected to a capacitor that passes the high frequency but blocks the welding frequency. The series combination of the capacitor and high frequency source is connected across the arc gap in parallel with the low frequeny welding current source. To keep the low frequency welding current source from short circuiting the high frequency source, a high frequency blocking inductance is placed in series with the welding current source.

The other way to couple the high frequency source to the welding circuit is by inductive coupling. The high frequency source is connected in circuit with the primary of a coupling transformer whose secondary is in series with the arc gap in the welding circuit.

In either of the above cases the inductive winding in the welding circuit must present a very low impedance to the low frequency welding current. In practice it has been determined that not more than 10 to 20 turns of an air core coil (fewer turns of an unsaturated iron core coil) can be tolerated without materially cutting down the output of a 60 cycle per second welding current source.

Since 1000 volts, or more, of high frequency energy must appear across this same coil, the impedance to the high frequency must be high, i. e., the high frequency voltage drop (induced voltage) must be of the order of 100 volts per turn. The voltage is proportional to the product of the current and the impedance, and the impedance (substantially all inductive reactance) in turn is approximately proportional to the product of the frequency and the inductance. With air core coils of constant inductance the induced voltage per turn is therefore a function of the product of the current and the frequency. With conventional oscillators this desired voltage per turn can be obtained safely and economically only at frequencies of from about 1 megacycle per second up to 20 megacycles per second or more. In general it may be stated that the ratio of the impedance presented to the high frequency source to the impedance presented to the welding current source must be of the order of at least 20,000 to 1.

There are several disadvantages inherent in the use of very high frequencies for arc starting or stabilizing. With frequencies of the order of a megacycle or more the wave length is not long as compared to the length of the welding cable leading from the welding machine to the electrode holder. As a result, standing waves are set up on the welding cable. It is therefore desirable to cut the welding cable to a predetermined length so that a voltage maximum will appear at the electrode holder. However, during normal use the welding cable may be coiled or stretched out, supported in the air, or laid on a conducting floor. The resulting changes in impedances cause multiple reflections, which alter the position of voltage maximum and make it difficult to prevent large impedance mismatches from existing between the high voltage source and the welding circuit. The effect is to reduce the voltage available at the electrode for arc starting or stabilization.

Another equally important disadvantage of using a high voltage source having a frequency of the order of a megacycle per second, or more, resides in the radiation from the apparatus. Since the length of welding cable is long in comparison to a quarter wave length, the welding cable acts as a transmitting antenna. This radiation not only places a load on the oscillator necessitating increased output over that required for arc starting or stabilization, but it may produce serious interference with wireless communications. Restrictions on the maximum permissible signal strength radiated from industrial equipment have already been imposed by certain regulatory bodies. The radiation problems may be reduced somewhat by placing a metallic shield over the welding cable to form a coaxial cable for the high frequency. In this case radiation is reduced but it is necessary to transmit the high frequency at low voltage level and transform it to a high voltage level at the electrode holder to avoid excessive dielectric loss in the cable. This is unsatisfactory because of the stiffness of such a cable, and because of the high cost and low durability of such a cable. In addition, the use of a high voltage transformer and decoupling elements in the electrode holder increase its size, weight, and cost. Other methods of suppressing radiation have been employed in the past but all are subject to comparable inherent disadvantages.

An object of this invention is to provide a method and apparatus for starting or stabilizing an electric welding arc that is reliable and efficient and free from the inherent disadvantages heretofore associated with the use of a high frequency alternating current source.

In accordance with the preferred embodiment of the invention, this object is achieved by making use of saturating effects in oxide or powdered metal cores to permit the use of relatively low frequency high voltage for arc starting or stabilization without appreciably increasing impedance in the welding circuit. The present method permits the use of relatively low starting and stabilizing frequencies of the order of 50 to 500 kilocycles per second instead of conventional high frequencies of the order of 2 to 20 megacycles per second and overcomes the numerous objections to the use of such higher arc starting and stabilizing frequencies. Inductive reactance on which induced voltage per turn depends is a function of the product of frequency and inductance. Therefore, if the inductance and the frequency are both varied the spread between the inductive reactance presented to the welding source and that presented to the arc stabilizing source can be made much greater than if frequency alone is varied. This principle is made use of in the present invention to permit the use of the relatively low frequencies without reducing the necessary impedance spread of the order of 20,000 to 1 required to induce sufficient high frequency voltage in the system without reducing the output of the welding source. This will be more fully understood from the drawings and the following description.

Figure 1:
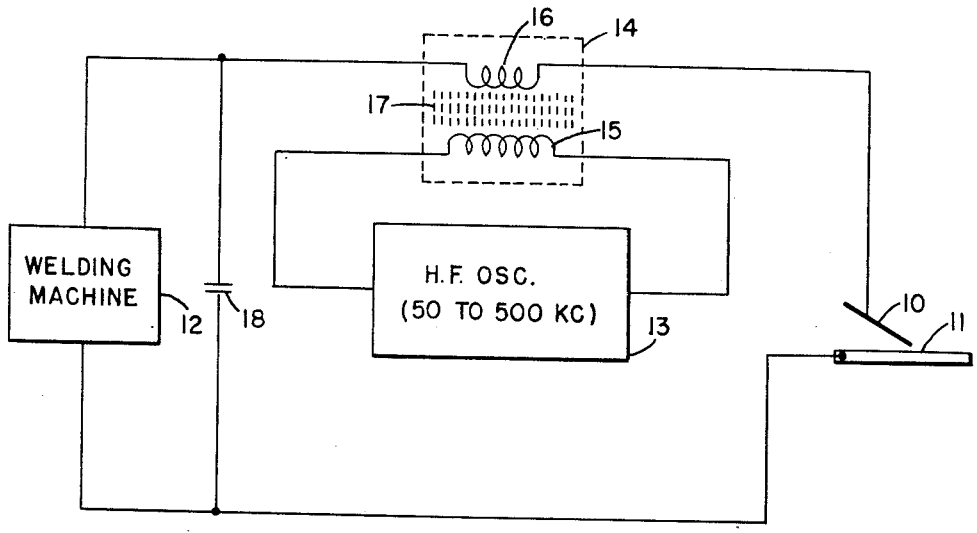
Fig. 1 is a block diagram of a series-connected high frequency stabilized arc welding circuit constructed in accordance with the present invention.

Fig. 1 illustrates an arc welding circuit including an electrode 10 and a workpiece 11 energized by an A. C. or D. C. welding machine 12 which may be a rotary generator, a rectifier, or a transformer. A high voltage source in the form of a high frequency oscillator 13, is coupled into the welding circuit by a coupling transformer 14 consisting of a primary winding 15, a secondary winding 16, and a core 17 of special and critical design. A by-pass capacitor 18 short circuits the high frequency around the welding machine.

For arc starting and stabilizing purposes the high voltage need be applied to the arc gap between the electrode and the work only when there is no welding current flowing, as is disclosed in my prior application Serial No. 41,761, filed July 31, 1948, now U. S. Patent 2,629,071. Specifically, the purpose of the high frequency high voltage in both A. C. and D. C. welding is to make the arc gap conductive by ionizing the gas in the arc gap so the welding current can bridge the gap to form the welding arc each time the operator starts to weld. In addition, in A. C. welding, for which this invention is particularly adapted, the high frequency discharge maintains the arc gap conductive during current reversals and alleviates the tendency for the arc to extinguish each time the current passes through zero in its periodic reversals. It is just during these short intervals that it is necessary to apply the high frequency high voltage. Having recognized the fact that the high frequency high voltage is required only when the welding current is zero, I have found that it is possible to employ a coupling means, coupling the high voltage output of the oscillator means into the welding circuit, that in effect plays a dual role by satisfying each impedance requirement alternately on a time-sharing basis. This is done basically by employing a core in the coupling means that is unsaturated by peak values of the starting or stabilizing current but is magnetically saturated by passage of the welding current through the secondary. Saturation of the core reduces the inductance L, and the impedance to the welding current, which is approximately equal to the product of $2\pi fL$, is very low. During periods of no welding current flow the core is unsaturated, the inductance L is high, and a high impedance is presented to the high frequency high voltage source.

In Fig. 1 the welding machine 12 might be a conventional 60 cycle transformer welder. To get a required minimum 20,000 to 1 impedance ratio with the conventional air core coupling transformer would require the use of a $20,000 \times 60$ or 1,200,000 cycle high voltage source. However, if the inductance of the coupling transformer can be reduced during a selected portion of the welding current cycle, for instance, to one-tenth of its value by being saturated by the welding current the frequency of the high voltage source need then only be 120,000 cycles per second, as demonstrated by the following:

Let $X$ = inductive reactance which is substantially equal to the impedance of the transformer.

Let the subscript HF represent high frequency and the subscript LF represent low frequency.

$$X_{HF} = 2\pi f_{HF} L_{HF}$$

$$X_{LF} = 2\pi f_{LF} L_{LF}$$

$$\frac{X_{HF}}{X_{LF}} = \frac{20,000}{1} = \frac{2\pi f_{HF} L_{HF}}{2\pi f_{LF} L_{LF}}$$

Because of saturation effects the ratio of inductance can be of the order of $$\frac{L_{HF}}{L_{LF}} = \frac{10}{1}$$

Then $$\frac{20,000}{1} = \frac{2\pi f_{HF}}{2\pi f_{LF}} \times \frac{10}{1}$$

Solving $$\frac{f_{HF}}{f_{LF}} = \frac{20,000}{10} = 2,000$$

In conventional A. C. welders $f_{LF} = 60$ cycles per second.
Therefore $$\frac{f_{HF}}{60} = 2,000$$

$$f_{HF} = 120,000 \text{ cycles per second}$$

Such a frequency for the high voltage source would be safe and at the same time overcome all the objections to high frequencies outlined above.

Air core coils or transformers present no opportunity for making use of the saturating effects. Iron core transformers are unsuitable for use with radio frequencies because of the extremely high core losses.

I have discovered, however, that if the coupling transformer core is made of magnetic ferrites the steps outlined above can be followed and all the advantages gained. Examples of suitable materials for the coupling transformer core of the present invention are ferromagnetic ferrites selected from the group consisting of compounds of metal oxides (not metals) having the general formula $MOFe_2O_3$ where M stands for a bivalent metal ion (for example, nickel, zinc, and magnesium). Physically these ferromagnetic ferrites are crystalline materials having the spinel structure, with mechanical properties like those of dry process porcelain. These magnetic ferrites per se form no part of the present invention and need not be described in detail here; for examples of suitable materials reference is made to U. S. Patent No. 2,452,529, issued to J. L. Snoek, October 26, 1948, and to the article "Magnetic ferrites" in Electrical Manufacturing for December 1949. The property that makes these materials particularly adaptable for use with the present invention is their extremely high volume resistivity and high permeability. They contain no metallic particles but consist only of oxides that resemble a ceramic, and, as a matter of fact are produced by firing in the manner of porcelain ceramics. It is this composition which is responsible for one of the main advantages of "Ferramics"

over powdered metal core materials. The fact that the oxides of metals, in contrast to the metals in metallic state, are very poor electrical conductors is the reason that ferrites exhibit extremely high volume resistivities, thus reducing eddy current losses to practically negligible quantities. Ferrites are markedly superior to powdered iron for use as core materials in this invention because in powdered iron the property of high volume resistivity is achieved by bonding finely divided metal particles in an organic, insulating binder, thereby sacrificing permeability as the core is in effect full of "air gaps." On the other hand ferrites with their natural high specific resistance do not have to be powdered and therefore the permeability is not diluted. Thus, whereas the maximum obtainable permeability of powdered metal rings is commonly about 125, ferrite rings have permeabilities greater than 1000. The higher permeability of the core, the more volts per turn are induced in the secondary for a given exciting current, and the less total turns are required. The less turns in the secondary, the less series reactance and resistance is presented to the welding current.

Thus, referring to Fig. 1, if the core 17 of the coupling transformer 14 is made of a material having high volume resistivity and high permeability, and it is designed with an appropriate configuration and cross-sectional area and operated so that the welding current saturates the core at a current value approximately equal to the peak value of the high frequency current, a high voltage source having a frequency of the order of 50 to 500 kilocycles may be employed. Such transformer design is well within the field of knowledge of those skilled in the art. During the periods of little or no welding current, i. e., prior to establishing the welding arc and during periods of welding current reversal in A. C. welding, the coupling transformer 14 presents the required high impedance to the high voltage source 13, permitting up to several thousand volts to appear across the terminals of the transformer secondary. Since capacitor 18 short circuits the high frequency around the welding machine this voltage appears across the arc gap between electrode 10 and workpiece 11. As soon as the welding current exceeds the peak value of the high frequency current, core 17 of the coupling means becomes magnetically saturated and the inductance is reduced, reducing substantially or eliminating the high voltage output. However, this is insignificant since no high voltage is required during periods of substantial welding current flow. By-pass capacitor 18 presents a very high impedance to the welding machine frequency whereas coupling transformer 14 presents a relatively low impedance during periods of welding current flow. This permits full welding power to be transferred to the arc. By use of a ferrite core material for transformer core 17, core losses are insignificant even at frequencies up to 500 kilocycles per second. High-quality powdered iron cores are satisfactory in some instances, but ferrites are preferred.

Figure 2:
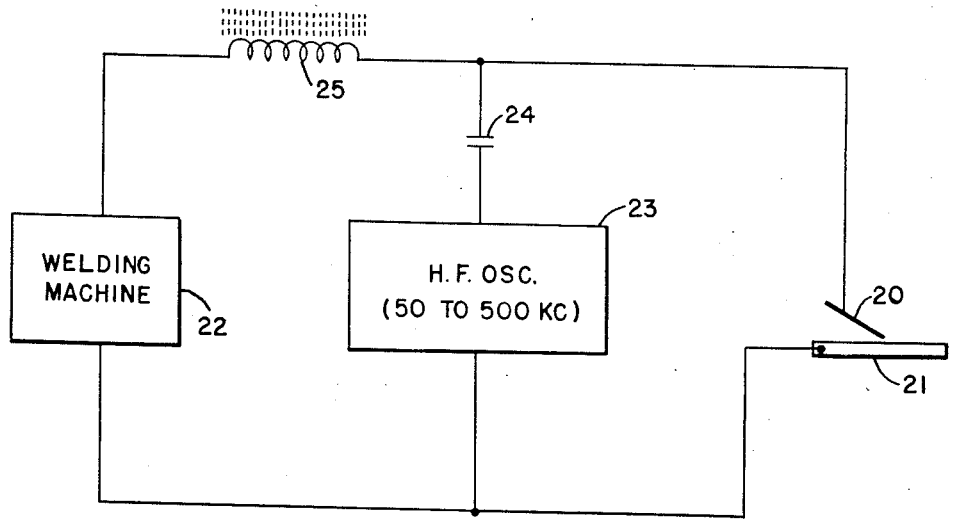
Fig. 2 is a block diagram of parallel-connected high frequency stabilized arc welding circuit constructed in accordance with the present invention.

The circuit represented by the block diagram of Fig. 2 is analogous in all respects to the series circuit of Fig. 1. A welding electrode 20 and a workpiece 21 are connected in an arc welding circuit energized by a welding machine 22. A high frequency high voltage source 23 is connected in parallel with the welding machine across the arc gap between the electrode and the work. A capacitor 24 is placed in series with the high frequency source to block welding current from this parallel circuit. A blocking inductor or choke 25, preferably made with a ferrite core and operated saturated by the welding current prevents the high frequency high voltage source from being short circuited through the welding machine during periods of little or no welding current and therefore the high voltage is available at the electrode at that time. Because of the saturation effects this choke presents little impedance to the welding current. For the same reasons disclosed in detail heretofore, a high frequency oscillator of relatively low frequency, i. e., from 50 to 500 kilocycles per second may be used and all the problems of high frequencies as used heretofore have been overcome.

Figure 3:
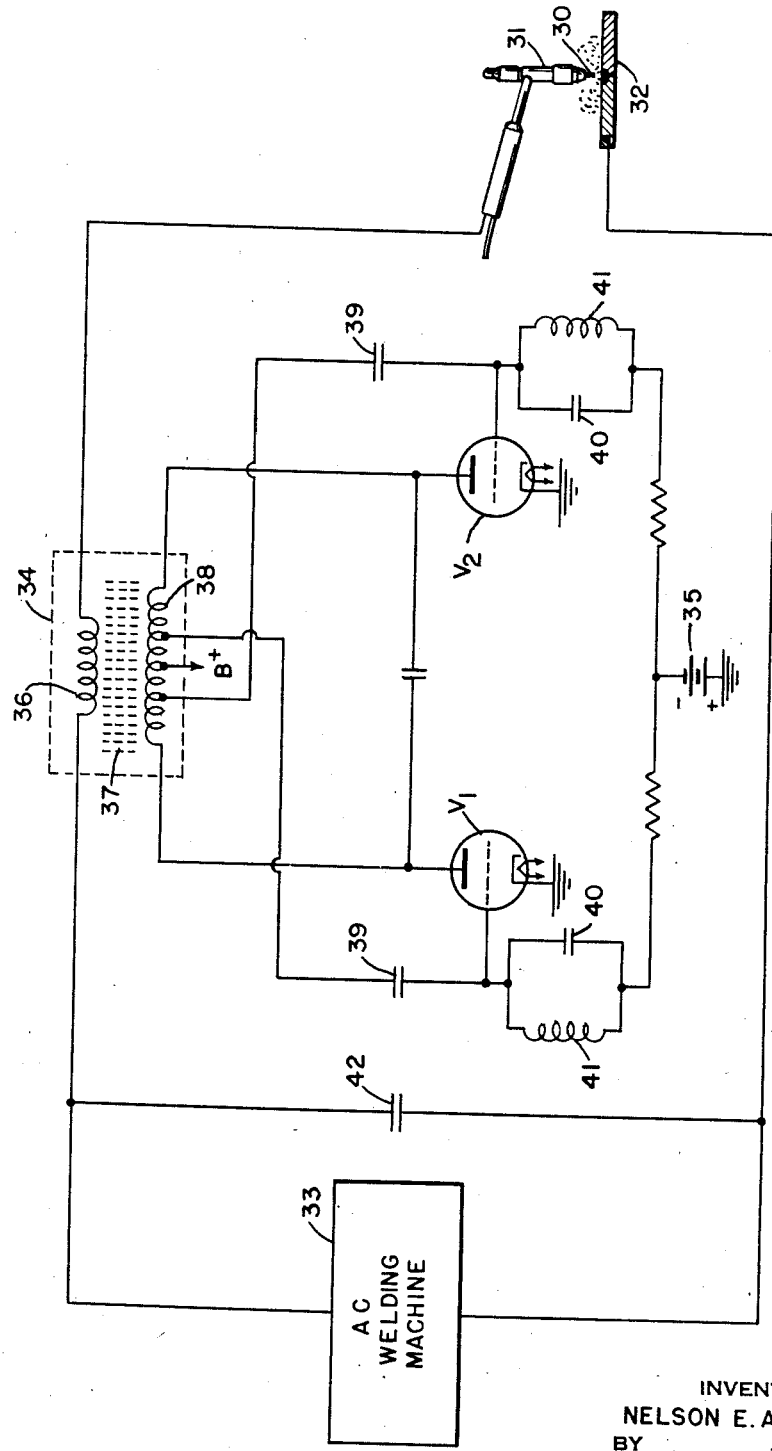
Fig. 3 is a schematic diagram of an A. C. arc welding circuit employing a specific embodiment of the present invention.

It may be seen from the foregoing that the high voltage need only be applied to the arc gap at times of no welding current, and when using the present invention the full value of the high voltage source can only be applied to the arc gap at such times as there is little or no welding current. I have found that the changing inductance caused by the periodic saturation of the core in the oscillator output circuit may be used to time the operation of the oscillator. One circuit operating on this principle is shown in Fig. 3.

An electrode 30 in an electrode holder 31, which is here illustrated as a gas-shielded electrode holder, and a workpiece 32 are connected in a welding circuit energized by an A. C. welding machine 33. The high voltage source in Fig. 3 comprises the vacuum tubes $V_1$ and $V_2$ and their associated circuits including the coupling transformer 34. This circuit is a conventional class C push-pull Hartley oscillator biased below cut-off by a fixed bias supply 35. When the welding current, which flows through winding 36 of transformer 34 falls below the value which saturates the ferrite core 37 as it reverses on each half cycle, a voltage is induced in winding 38. This raises the voltage on the plate of one vacuum tube and lowers the voltage on the plate of the other. Through the coupling capacitors 39, one grid is raised into the conduction region and oscillations begin. Oscillations cease when the welding current is re-established and saturates core 37. This loads and detunes the oscillator. Tuned circuits represented by capacitors 40 and inductances 41 in the grid returns of $V_1$ and $V_2$ assure oscillation at normal oscillator frequency only. A by-pass capacitor 42 provides a short circuit for the high frequency around the welding machine. This capacitor offers a high impedance to the welding frequency. Other oscillator circuits can be substituted for the Hartley oscillator circuit illustrated.

By means of the above described mode of operation it may be seen that the oscillator is automatically triggered on each current reversal to stabilize the A. C. welding arc. The high frequency source used in this invention is preferably a constant frequency vacuum tube oscillator. The advantage of using a circuit of the general type disclosed above and illustrated in Fig. 3, is that the oscillator need only operate for very short intervals, i. e., it has a low-duty cycle. This has the economic advantage of making it possible to use much smaller and less expensive circuit components in the oscillator.

From the foregoing description it can be seen that a system has been devised for arc starting or arc stabilization in which frequencies of the order of 50 to 500 kilocycles per second are employed in the high voltage source. This has been made possible by the use of a saturating core in the decoupling network to the welding machine or in the output circuit of the oscillator. This requires the use of a core material of high magnetic permeability and low losses. This invention is useful for consumable electrode arc welding and for non-consumable electrode arc welding. The invention is not limited to the specific disclosure made herein, but includes the novel and inventive concepts defined by the appended claims.

I claim:

1. Arc welding apparatus comprising in a circuit an electrode and a workpiece and an arc gap therebetween a low frequency source of welding current connected to supply welding current to said electrode and workpiece, an auxiliary high frequency high voltage source of current connected to supply an arc stabilizing current to said electrode and said workpiece, and variable impedance means interposed between said low frequency source of welding current and said arc gap which presents a high impedance to the high frequency high voltage source when the value of welding current is low, and a low impedance to the low frequency source of welding current, the ratio of said impedance to said high frequency high voltage source to the impedance to said welding current source being greater than the ratio of the frequency of said high voltage source to the frequency of said welding current source.

2. Arc welding apparatus comprising in a circuit an electrode and a workpiece and an arc gap therebetween a low frequency source of welding current connected to supply welding current to said electrode and workpiece, an auxiliary high frequency high voltage source of current connected to supply an arc stabilizing current to said electrode and said workpiece, and an inductive reactance interposed between said low frequency source of welding current and said arc gap having a core of high magnetic permeability and high volume resistivity which is unsaturated by the high frequency current and is saturated by a partial peak value of the welding current.

3. In an arc welding circuit including a low frequency source of welding current, a high frequency source of arc stabilizing current and an inductive reactance device having a core of high magnetic permeability and high volume resistivity, the method of operation which comprises saturating said core with a low value of welding current so that during periods of welding current in excess of said low value said inductive reactance presents a low impedance, and which comprises maintaining said core below saturation at substantially all values of said high frequency are stabilizing current to permit said inductive reactance device to present a high impedance to said high frequency source during periods of welding current flow below said low value.

4. Arc welding apparatus comprising in a circuit an electrode and a workpiece and an arc gap therebetween a low frequency source of welding current connected to supply welding current to said electrode and workpiece, a high voltage source of current having a frequency of between 50 kilocycles per second and 500 kilocycles per second connected to supply arc stabilizing current to said electrode and said workpiece, and an inductive reactance interposed between said low frequency source of welding current and said arc gap having a core of high magnetic permeability and high volume resistivity which core is unsaturated by the high frequency current and is saturated by a partial peak value of the low frequency welding current.

5. Arc welding apparatus comprising in a circuit an electrode and a workpiece and an arc gap therebetween a low frequency source of welding current connected to supply welding current to said electrode and workpiece, a high voltage source of current having a frequency of between 50 kilocycles per second and 500 kilocycles per second connected to supply an arc stabilizing current to said electrode and said workpiece, and an inductive reactance interposed between said low frequency source of welding current and said arc gap having a core of ferromagnetic metal oxides of the formula $MOFe_2O_3$, where M stands for a bivalent metal ion, which core is unsaturated by the high frequency current and is saturated by a partial peak value of the low frequency welding current.

6. Arc welding apparatus comprising in a circuit an electrode and a workpiece and an arc gap therebetween, a source of low frequency welding current connected to supply welding current to said electrode and workpiece; a source of high frequency, high voltage current, and means interposed in said arc welding circuit for coupling the output of said high frequency source into the welding circuit, said means comprising a transformer having a ferromagnetic core with high magnetic permeability and low magnetic losses, said core being saturated at low welding currents, but unsaturated by the high frequency current alone, the ratio of the transformer impedance presented to the high frequency source when unsaturated to the transformer impedance presented to the welding frequency source when saturated being greater than the ratio of the high frequency to the low frequency.

7. Electric arc welding apparatus including a workpiece and an electrode and an arc gap therebetween, a source of low frequency welding current in a circuit across said gap; a source of high frequency, high voltage current in parallel circuit relation with said low frequency welding current source across said gap; and decoupling means in said low frequency welding current circuit, said decoupling means comprising a blocking inductor having a magnetic ferrite core of high magnetic permeability and high volume resistivity, said core being saturated at a low value of welding current but unsaturated by the high frequency current alone, the ratio of the impedance of the blocking inductor to the high frequency source when unsaturated to the impedance of the blocking inductor to the welding frequency when saturated being greater than the ratio of the high frequency to the low frequency.

8. In an arc welding circuit including a low frequency source of welding current, a high frequency source of arc stabilizing current and an inductive reactance device having a core of high magnetic permeability and high volume resistivity, the method of operation which comprises saturating said core with a low value of welding current so that during periods of welding current in excess of said low values said inductive reactance presents a low impedance, and which comprises maintaining said core below saturation at substantially all values of said high frequency arc stabilizing current to permit said inductive reactance device to present a high impedance to said high frequency source during periods of welding current flow below said low value, and applying said high frequency arc stablizing current only during periods when said core is unsaturated.

9. Arc welding apparatus comprising in a circuit an electrode and a workpiece and an arc gap therebetween a source of welding current connected to supply welding current to said electrode and workpiece, an auxiliary high frequency high voltage source of current connected to supply an arc stabilizing current to said electrode and said workpiece, and an inductive reactance interposed between said low frequency source of welding current and said arc gap having a core of high magnetic permeability and high volume resistivity which core is unsaturated by the high frequency current and is saturated by a partial peak value of the welding current, said auxiliary high frequency high voltage source of current being operable only when said core is unsaturated.

10. An alternating current arc welding system comprising in a circuit an electrode and a workpiece and an arc rent connected to supply welding current to said electrode workpiece and an inductive reactance device interposed between said low frequency source of welding current and said arc gap having a core of high magnetic permeability and high volume resistivity which is saturable at a low value of the welding current, and a source of high voltage arc stabilizing current having a frequency of from 50 kilocycles per second to 500 kilocycles per second connected to supply an arc stabilizing current to said electrode and said workpiece, and having a peak value of current insufficient to saturate said core whereby said inductive reactance presents a high impedance to said high frequency source during periods of welding current flow below said low value.

References Cited in the file of this patent

UNITED STATES PATENTS

| | | |
|---|---|---|
| 2,452,529 | Snoek | Oct. 26, 1948 |
| 2,482,473 | Fromm | Sept. 20, 1949 |
| 2,495,155 | Ankenman | Jan. 17, 1950 |
| 2,495,183 | Roberts | Jan. 17, 1950 |
| 2,516,016 | Pakala | July 18, 1950 |